Aug. 25, 1925.  J. M. JUNG  1,550,725

VALVE

Filed Jan. 13, 1925

Inventor
John M. Jung

Patented Aug. 25, 1925.

1,550,725

UNITED STATES PATENT OFFICE.

JOHN M. JUNG, OF SIOUX CITY, IOWA, ASSIGNOR TO HANFORD PRODUCE CO., OF SIOUX CITY, IOWA.

VALVE.

Application filed January 13, 1925. Serial No. 2,150.

*To all whom it may concern:*

Be it known that I, JOHN M. JUNG, a citizen of the United States, and a resident of Sioux City, in the county of Woodbury and State of Iowa, have invented certain new and useful Improvements in Valves, of which the following is a specification.

My invention relates to that type of valve which is ordinarily used to control the flow of fluid through a pipe line in a machine wherein the flow of fluid is to be controlled automatically by a variable factor of the machine.

It is my object to provide such a valve of simple, durable and inexpensive construction, in which the uncovering of the valve port is obtained by the sliding of a valve element relative to a valve seat, the coacting faces thereof being flat.

Another object is to provide a valve which will not vibrate under the action of water flowing therethrough under pressure.

Another object is to provide such a valve having a slidable valve element and an actuating rod having a connection therewith such that there is no play between the two in the direction of movement thereof, but the two are at the same time independent of each other to such an extent that the valve element will rest freely against the valve seat.

A further object is to so form the valve element and seat, and so arrange the openings therein that certain areas surrounding the respective openings in each member will remain at all times covered so as to minimize the possibility of leakage due to corrosion.

Another object is to provide a structure embodying a casing, having removable cover plates permitting ready access to the operative valve element.

More specifically, referring to the foregoing object, it is my purpose to provide a casing having opposed cover plates, one of the plates serving to support, as an integral part thereof, the valve seat, and the other plate securing one end of a coil spring partially compressed between said plate and a slidable valve element for holding said valve element against the valve seat, and yet permitting sliding movement thereof.

Another object is to provide a connection between the sliding valve element and the actuating rod therefor, permitting ready removal of the valve element.

A still further object is to provide a valve in which the ratio of the area of the opening of the valve ports to the amount of movement of the valve element is a factor increasing as the valve element is moved toward open position.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1:
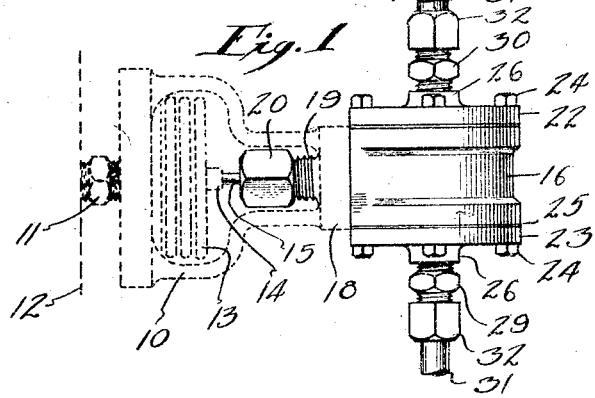
Fig. 1 is a side elevation of my valve installed in connection with a pressure actuated control device, the latter being shown in dotted lines.

In Fig. 1 I have shown my improved valve applied to a known form of pressure controlled mechanism, which includes a casing, 10, joined, by means of a nipple, 11, to a portion of a machine, such as an ammonia refrigerating machine, or the like, which is indicated by the line, 12. The nipple, 11, serves to transmit fluid pressure to the diaphragm elements, 13, the outer of which is provided with a threaded boss, 14, to which is attached the threaded actuating rod, 15, of my improved valve.

The valve casing I preferably make in cylindrical form, as shown, and it comprises the cylindrical chamber, 16, having an integral threaded lug, 17, formed on one side thereof and receivable in the threaded sleeve, 18, of the member, 10, the lug, 17, being extended to form a smaller threaded neck, 19, adapted to receive a packing gland nut, 20, and bored with a cylindrical opening through which the actuating rod, 15, is extended into the interior of the chamber, 16. The ordinary packing material, 21, surrounds the rod, 15, within the packing nut, and serves to effectively seal the opening through which the rod, 15, is extended. The boss, 17, is of larger diameter than the packing nut, 20, in order that the nut may be received through the sleeve, 18.

Cover plates, 22 and 23, are secured to the open ends of the cylindrical member, 16, by means of cap screws, 24, and gaskets, 25, serve to effect a fluid-tight union. Lugs, 26, are formed on the respective cover plates, are provided with ports, 27 and 28, to allow entrance and escape of the fluid to the valve chamber, and are threaded internally to receive the nipples, 29 and 30, respectively.

The tubes, 31, of the pipe line in which the valve is interposed are joined to the nipples, 29, by means of the packing nuts, 32.

Figure 2:
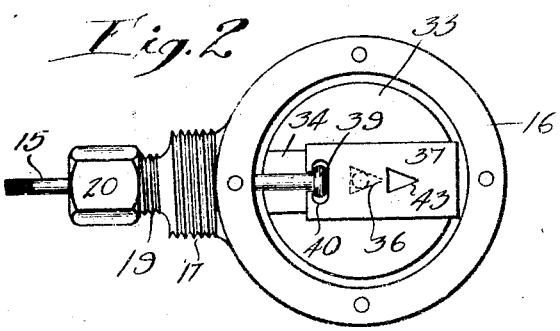
Fig. 2 is a plan view of the valve with the upper cover plate removed.

Formed on the lower cover plate, 23, is the valve seat, 33, having the flat upper face, 34, and cut away to form the perpendicular parallel sides, 35. The opening, 28, is extended up through the valve seat and at its upper end is widened out into the triangular shape illustrated at 36 in Fig. 2. The movable valve element, 37, has an under face machined flat to fit closely against the face, 34, of the valve seat, and channeled in to form the flanges, 38, which are spaced to loosely receive the sides, 35, of the valve seat and yet to accurately position the valve element laterally.

The inner end of the actuating rod, 15, is provided with a head, 39, and a T-slot, 40, is formed in the end of the valve element, 37. The valve seat is positioned to substantially align the valve element, 37, with the rod, 15, and in assembling the element is simply dropped into place over the head of the rod. The rod, 15, is positioned midway between the ends of the chamber, 16, so that the cover plate, 23, may be attached to either end of the chamber in assembling.

Figure 4:
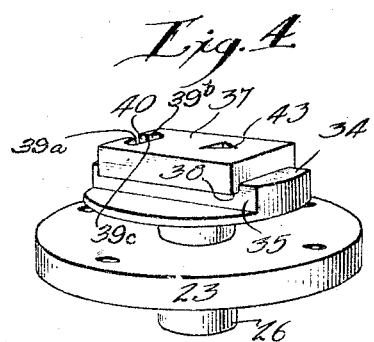
Fig. 4 is a perspective view of the lower cover plate, the valve seat and the slidable valve element thereon.

The head, 39, of the rod, 15, is shaped as an oblate spheroid, as shown, and engages the T-slot, 40, at three points indicated at 39$^a$, 39$^b$ and 39$^c$, in Fig. 4. The resulting connection is similar to a universal joint, in that a certain amount of angular displacement of the longitudinal axis of the valve element relative to that of the rod, 15, in any direction, is allowed, but there is no play between the two members in the line of their movement. The upper port, 27, is enlarged, as at 41, to receive a coil spring, 42, the lower end of which freely engages the valve element, 37.

A triangular opening, 43, is formed in the valve element, 37, of substantially the same shape and size as the mouth, 36, of the port, 28.

Figure 3:
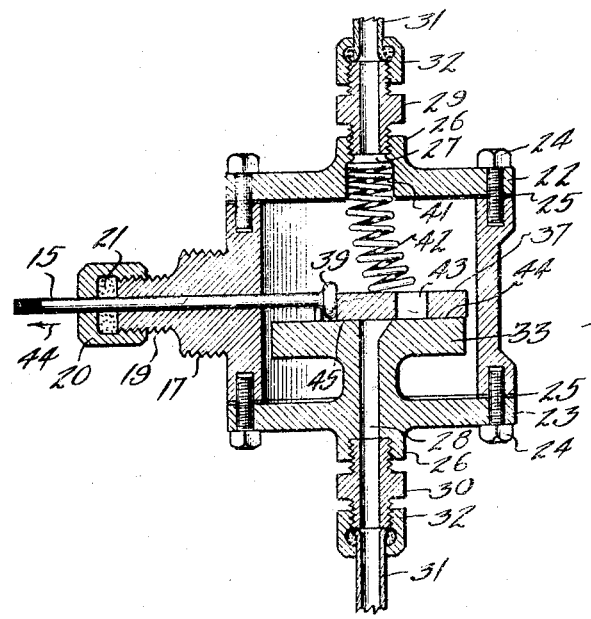
Fig. 3 is a central vertical longitudinal sectional view of the valve.

In Fig. 3 the parts are shown in closed position. Movement of the rod, 15, in the direction indicated by the arrow, 44, will bring the opening, 43, to register with the valve mouth, 36, the opening, 43, registering first with the narrow part of the mouth and gradually registering with the wider portions thereof. A constant movement of the valve element toward open position will therefore increase the valve opening in much faster ratio and a more delicate adjustment of the valve near its closing position is thus obtained.

The spring, 42, being engaged against the valve element, 37, under some pressure, will tend to move with the valve element at its lower end, but being secured at its upper end against movement laterally, it will continue to exert a downward pressure against the valve element irrespective of its position.

As illustrated in Fig. 3, certain portions of the valve seat and valve element will be exposed to the action of the fluid. In the ordinary valve the engaging portions of the valve and valve seat are entirely exposed to the action of the fluid while open and tend to be corroded thereby, especially where the fluid is heated, even though it be ordinary water. The sliding action of my valve tends to prevent corrosion and to constantly wear the faces of the coacting valve members to a perfect fit. In addition, leakage of the fluid is further guarded against by the fact that those areas of the coacting faces which are outside of the limits of movement of the respective valve openings, are never exposed to the corrosive action of the fluid. In Fig. 3 these areas are represented in cross section, by those portions of the faces of the valve members which are covered by their coacting valve members, as at 44 and 45.

In many uses where the valve is positioned upright, as shown in Fig. 3, the spring, 42, may be dispensed with, since the weight of the valve element by itself is sufficient to form a perfect fit. In other cases, however, it may be desired to use the valve in a horizontal position, wherein the spring, 42, will be necessary.

The construction described permits ready access to the interior of the valve by removal of the cover plate, 22, where it is desired to clean the valve of sedimentary deposits, or the like, or if it is desired to reface the valve element, 37. If it is desired to resurface the valve seat, 33, the lower cover plate may be removed and replaced, or a new one substituted.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a valve, a casing provided at each end with a removable cover plate, a valve seat formed on one of the cover plates provided with a valve opening, the other cover plate being provided with a port, a valve element slidably mounted on the valve seat, an actuating member extending through the side of the valve casing and engaging the valve element, and a coil spring engaging the valve element at one end and retained at its other end in the said port, the parts being so arranged that the removal of the cover plate carrying the spring will allow ready access to the valve element.

2. In a valve, a casing having an open end, a valve seat facing said open end, a valve actuating rod extended through the side of the casing and having a head at its inner end, a valve element mounted on the seat for sliding movement transversely of the casing, said element being provided with a T-slot to receive the actuating rod and join the valve element to the rod in such a manner as to allow ready removal of the valve element through the open end of the valve casing, in a direction substantially perpendicular to the rod, a cover plate for the open end of the casing, and a coil spring secured by the cover plate and freely engaging the valve element at its other end.

Signed at Sioux City, in the county of Woodbury and State of Iowa, this 7th day of January, 1925.

JOHN M. JUNG.